US007609916B2

United States Patent
Santori et al.

(10) Patent No.: US 7,609,916 B2
(45) Date of Patent: Oct. 27, 2009

(54) ELECTRICAL CONTACT APPARATUS FOR OPTICAL WAVEGUIDES

(75) Inventors: Charles M. Santori, Palo Alto, CA (US); Duncan Stewart, Palo Alto, CA (US); Philip J. Kuekes, Palo Alto, CA (US); Theodore I. Kamins, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/900,714

(22) Filed: Sep. 13, 2007

(65) Prior Publication Data

US 2009/0074368 A1 Mar. 19, 2009

(51) Int. Cl.
*G02B 6/12* (2006.01)
(52) U.S. Cl. ....................................... 385/14
(58) Field of Classification Search ................. 385/14
See application file for complete search history.

(56) References Cited

U.S. PATENT DOCUMENTS

| 6,438,149 | B1 | 8/2002 | Tayebati et al. |
| 6,574,379 | B2 * | 6/2003 | Miyazaki ................ 385/1 |
| 6,645,784 | B2 | 11/2003 | Tayebati et al. |
| 6,711,200 | B1 | 3/2004 | Scherer et al. |
| 6,839,491 | B2 | 1/2005 | Painter et al. |
| 6,895,148 | B2 * | 5/2005 | Gunn, III ................ 385/50 |
| 6,898,227 | B2 | 5/2005 | Crawford |
| 6,970,490 | B2 | 11/2005 | Holmes et al. |
| 7,242,823 | B2 * | 7/2007 | Karashima et al. ........ 385/14 |
| 2002/0031155 | A1 | 3/2002 | Tayebati et al. |
| 2003/0012231 | A1 | 1/2003 | Tayebati et al. |
| 2004/0114930 | A1 | 6/2004 | Krug et al. |
| 2005/0053347 | A1 * | 3/2005 | West et al. ............... 385/129 |
| 2006/0072875 | A1 | 4/2006 | Bhagavatula et al. |
| 2006/0145063 | A1 | 7/2006 | Steinberg et al. |
| 2006/0215949 | A1 | 9/2006 | Lipson et al. |

FOREIGN PATENT DOCUMENTS

| KR | 10-1999-0043118 A | 6/1999 |
| WO | WO 99/34484 A2 | 7/1999 |
| WO | WO 2004/017546 A2 | 2/2004 |

OTHER PUBLICATIONS

International Search Report; PCT Patent Application No. PCT/U52008/010532, filed Sep. 8, 2008; search issued by Korean Patent Office (ISA) Jan. 28, 2009.

* cited by examiner

*Primary Examiner*—Uyen Chau N Le
*Assistant Examiner*—Rhonda S Peace

(57) ABSTRACT

An optical apparatus includes a waveguide configured to propagate optical energy; an electrical contact surface; and a semiconductor electrical interconnect extending from a first surface of the optical waveguide to electrical communication with the electrical contact surface. The semiconductor electrical interconnect comprises a geometry configured to substantially confine the optical energy to the waveguide.

20 Claims, 8 Drawing Sheets

ELECTRICAL CONTACT APPARATUS FOR OPTICAL WAVEGUIDES

BACKGROUND

Light beams or optical signals are frequently used to transmit digital data between electronic devices, both over long distances and between adjacent circuit boards. A light beam may be modulated as needed to carry data. An optical signal may also be used for other purposes including position or motion sensing, measurement, etc.

Consequently, optical technology plays a significant role in modern electronics, and many electronic devices employ optical components. Examples of such optical components include optical or light sources such as light emitting diodes and lasers, waveguides, fiber optics, lenses and other optics, photo-detectors and other optical sensors, optically-sensitive semiconductors, and others.

In some optical applications, optical waveguides are used together with electrical currents to accomplish desired tasks. For example, in waveguide modulators, an electronic signal modulates the index of refraction of the waveguide material, either through the electro-optic effect or through charge injection, imparting a phase or amplitude modulation on the optical signal, depending on the waveguide configuration. As another example, optical detectors integrated into waveguides can output an electrical signal representative of an optical signal present in the waveguide. Such waveguide devices require an electrical connection to at least one electrical contact, where charge may be selectively injected, removed, or measured.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
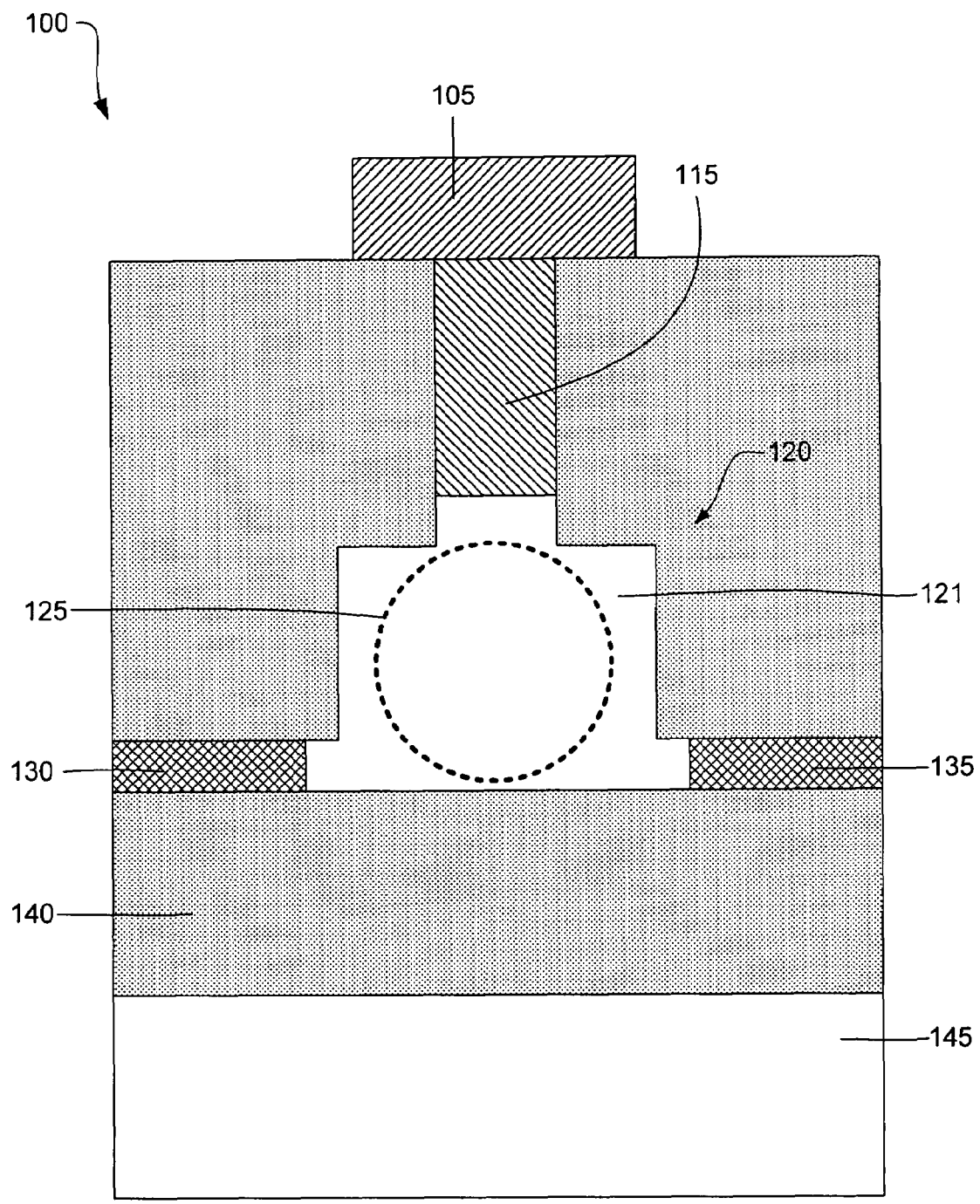
FIG. 1 is a cross-sectional diagram of an exemplary optical apparatus, according to principles described herein.

As described above, optical waveguides may be used in many applications, and, in many cases, optical waveguides may require the selective injection, removal, or measurement of electrical charge at one or more electrical contacts to correctly perform their intended functions. Often, these electrical contacts are metallic.

Semiconductor optical waveguides are typically formed by growing a semiconductor structure having certain geometric properties and dimensions within an oxide layer deposited on a semiconductor substrate. Portions of the semiconductor structure may be doped with electronic carriers, (i.e., electrons, holes, or both). However, when it is desired to selectively inject or remove charge from semiconductor waveguides, a significant problem may be presented by placing metallic electrodes in direct physical contact with the waveguides. Specifically, metal in close proximity to an area of optical propagation in a semiconductor material may significantly affect the optical mode(s) supported by the waveguide, most significantly, by increasing absorption. This increased absorption must be avoided in devices based on highly resonant structures such as micro-rings or in devices with long propagation lengths, such as Mach-Zehnder modulators.

To overcome the problems mentioned above and the limitations of the prior art, the present specification discloses an optical apparatus having a waveguide configured to propagate optical energy and a semiconductor electrical interconnect. The semiconductor electrical interconnect extends from a first surface of the optical waveguide and is electrically connected to an electrical contact surface. The semiconductor electrical interconnect has a geometry configured to substantially confine the optical energy inside of the waveguide, so that the optical mode does not reach the electrical contact surface.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical beam."

As used in the present specification and in the appended claims, the term "electrical interconnect" refers broadly to a component that links portions of an electrical pathway along which an electrical current is propagating to an optical device. The electrical interconnect may guide or redirect the electrical current such that charge carriers are injected in or removed from an optical waveguide. The term "semiconductor electrical interconnect" refers to an electrical interconnect fabricated out of a semiconductor material. Semiconductor electrical interconnects may be doped with impurities, such as electron donors or electron acceptors, to improve the ability of the semiconductor material to conduct an electric current.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary optical apparatus and methods of fabricating optical apparatus.

Exemplary Optical Apparatus

Referring now to FIG. 1, a cross-sectional view of an exemplary optical apparatus (100) is shown. The optical apparatus (100) includes an optical waveguide (120) configured to propagate optical energy. The optical waveguide (120) is fabricated out of a semiconductor material. Examples of suitable semiconductor materials for an optical waveguide (120) according to the present specification include, but are not limited to, silicon, germanium, and gallium arsenide. The optical waveguide (120) may include a central portion (121) of substantially intrinsic semiconductor material and side portions (130, 135) of doped semiconductor material. For example, the optical waveguide (120) may be of type n-i-n, a well-known configuration in which the central portion (121) is substantially intrinsic and the side portions (130, 135) are doped with n-type electron donor impurities. In other embodiments, the optical waveguide (120) may be one of types n-i-p (an intrinsic central portion having one side portion doped with n-type impurities and another side portion doped with p-type impurities), p-i-p (an intrinsic central portion having both side portions doped with p-type impurities), or other configurations known in the art.

The components of the optical apparatus (100), including the semiconductor optical waveguide (120), are fabricated in this example on a semiconductor substrate (145). The optical waveguide (120) is fabricated on an oxide material (140) grown or deposited on the semiconductor substrate (145). Additional oxide material is placed over the optical waveguide (120) such that the waveguide (120) is substantially surrounded by the oxide. In some embodiments, the oxide may be silicon dioxide ($SiO_2$). In other embodiments, other insulating materials besides oxides may be used to insulate the waveguide (120). In additional embodiments, an insulating substrate may be used. The indices of optical refraction of the intrinsic semiconductor material in the center portion (121), the doped side portions (130, 135) and the oxide material (140) are such that optical energy of a certain wavelength or range of wavelengths is substantially confined within the center portion (121) of the optical waveguide (120). An approximation of the optical mode (125) of the optical waveguide (120) is shown in the present figure as a dashed circle. This optical mode (125) is a function of the geometric properties and complex index of refraction of the center portion (121), doped side portions (130, 135), and oxide material (140).

In other embodiments, the optical waveguide (120) may be surrounded by another type of dielectric material or a vacuum. However, the indices of refraction of any dielectric material, the intrinsic semiconductor material in the center portion (121) of the waveguide (120), and the doped side portions (130, 135) of the waveguide (120) must be such that optical energy propagating through the waveguide (120) is substantially confined within the center portion (121) of the waveguide (120).

In some embodiments, the waveguide (120) may be used as a component in an optical resonator such as a ring resonator or a Fabry-Perot cavity. In these embodiments, as well as those involving lasers and modulators, it may be desirable to create or modify an electrical field within the optical waveguide (120) to selectively alter some of the optical properties of the waveguide (120). In other situations, it may be desirable to monitor a changing electric field in the waveguide (120) and, by extension, monitor the presence and/or characteristics of optical energy propagating through the waveguide (120). To accomplish these and other tasks, the waveguide (120) is placed in electrical communication with at least one electrical contact surface (105) (electrode) disposed on the oxide material (140) and accessible to an external power source. Such electrical contact surfaces (105) are typically made out of metallic materials.

However, it has been found that metallic materials, when brought into close proximity of an optical waveguide (120) (e.g., at a distance from the optical waveguide smaller than one wavelength of the optical energy that propagates through the waveguide), tend to destroy the optical mode (125) of the optical waveguide (120). Therefore, a semiconductor electrical interconnect (115) is in electrical communication with the electrical contact surface (105). The semiconductor electrical interconnect (115) extends vertically from the optical waveguide (120) to the metallic electrical contact surface (105). The semiconductor electrical interconnect (115) may be doped with charge donors or charge acceptors to improve electrical conductivity.

The geometry of the semiconductor electrical interconnect (115) is such that optical energy propagating through the optical waveguide (120) is substantially confined to the waveguide (120). In the example shown, the width of the semiconductor electrical interconnect (115) is smaller than that of the guided optical mode (125), thus restricting the optical mode (125) from extending upward and into the electrical interconnect (115).

Moreover, the electrical interconnect extends for a sufficient distance (typically greater than one wavelength of the optical energy propagating or expected to propagate through the waveguide) from the optical waveguide (120) to the electrical contact surface (105) to ensure that the metallic electrical contact surface (105) does not substantially interfere with the optical properties of the optical waveguide (120). In this manner, the semiconductor electrical interconnect (115) acts as a barrier to the optical mode (125), but allows electrical current to flow between the electrical contact surface (105) and the optical waveguide (120).

One basic physical concept of operation for the optical apparatus (100) is that of making the electrical interconnect (115) out of a composite structure containing regions of differing refractive indices, the composite structure having a lower effective refractive index than that of the semiconductor used in the center of the resonator or waveguide (120).

Any geometry of the electrical interconnect (115) which produces a lower effective index of refraction than that of the waveguide (120) while providing a conducting path is suitable. Exemplary geometric structures of the electrical interconnect (115) may include, but are not limited to, ridges, recesses, holes, nanoholes, and nanowires.

Figure 2:
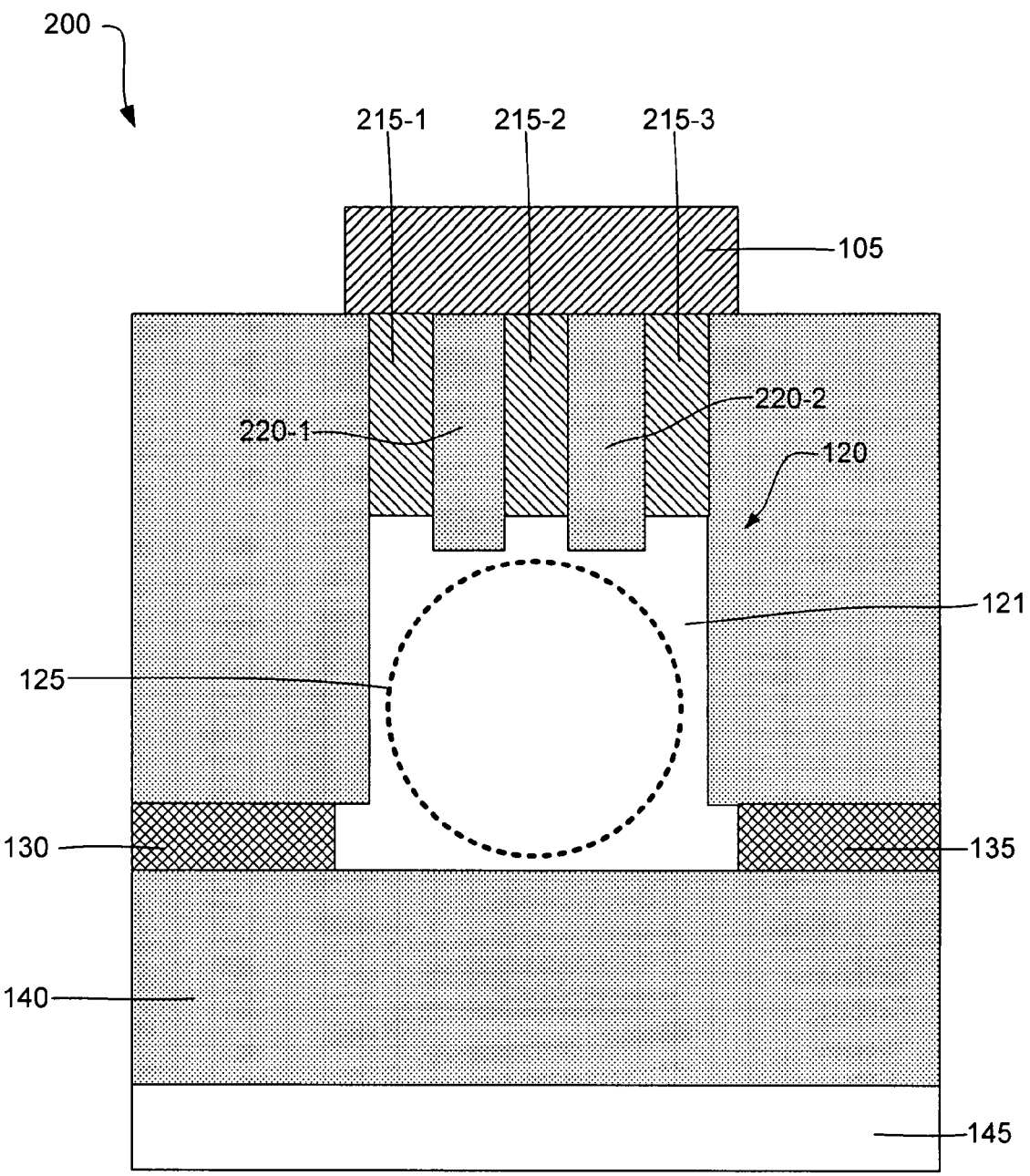
FIG. 2 is a cross-sectional diagram of an exemplary optical apparatus, according to principles described herein.

Referring now to FIG. 2, a cross-sectional view of another exemplary optical apparatus (200) is shown. Similar to the optical apparatus (100, FIG. 1) described previously, the optical apparatus (200) includes an optical waveguide (120) fabricated out of a semiconductor material having a substantially intrinsic central portion (121) and doped side portions (130, 135). The optical waveguide (120) is fabricated on a layer of oxide material (140) grown on a semiconductor substrate (145). Additional oxide material is grown around the optical waveguide (120).

To selectively inject, remove, and/or measure electrical charge, an electrical contact surface (105) is disposed directly above the optical waveguide (120). Three semiconductor electrical interconnects (215) are in electrical communication with both the optical waveguide (120) and the electrical contact surface (105). The semiconductor electrical interconnects (215) extend vertically from the optical waveguide (120) to the electrical contact surface (105). As the semiconductor electrical interconnects (215) have subwavelength dimensions (with respect to the optical energy that propagates through the optical waveguide), the optical energy is approximately confined to the optical mode (125) illustrated. As described previously, the semiconductor electrical interconnects (215) may be doped with p-type or n-type charge carriers to achieve a desired level of electrical conductivity and further confine the optical mode (125) to the optical waveguide (120).

Some advantages may be present in the use of multiple semiconductor electrical interconnects (215) such as those shown in the present example. For example, an electrical field applied to the optical waveguide (120) through the electrical contact surface (105) and multiple electrical interconnects (215) may be more consistent and uniform within the optical waveguide (120) than an electric field applied to the optical waveguide (120) through a single subwavelength electrical interconnect (115, FIG. 1). Electrical measurements taken at the electrical contact surface (105) may also be more accurate with multiple electrical interconnects (215). Moreover, a plurality of such electrical interconnects may provide more mechanical stability to the optical apparatus (200) than an optical apparatus having only one semiconductor electrical interconnect (115, FIG. 1). As mentioned with respect to the previously described optical apparatus (100), the present optical apparatus may be used as an optical resonator. The aforementioned electrical and mechanical advantages may be particularly significant in these embodiments Recesses (220-1, 220-2) between the semiconductor electrical interconnects (215) are shown filled with an oxide such as silicon dioxide in the present example. In other embodiments, recesses (220-1, 220-2) between semiconductor electrical interconnects may be filled with air or some other insulating material having a low index of refraction. In still other embodiments, the recesses (220-1, 220-2) may have a full or partial vacuum present. The recesses (220-1, 220-2) shown in the present example are trenches formed in the material of the semiconductor electrical interconnects (215). The trenches may be formed by selectively etching the semiconductor material of the electrical interconnects (215) and optionally the optical waveguide (120). In other embodiments, the recesses may include holes, nanoholes, or a combination of trenches, holes, and/or nanoholes.

Figure 3:
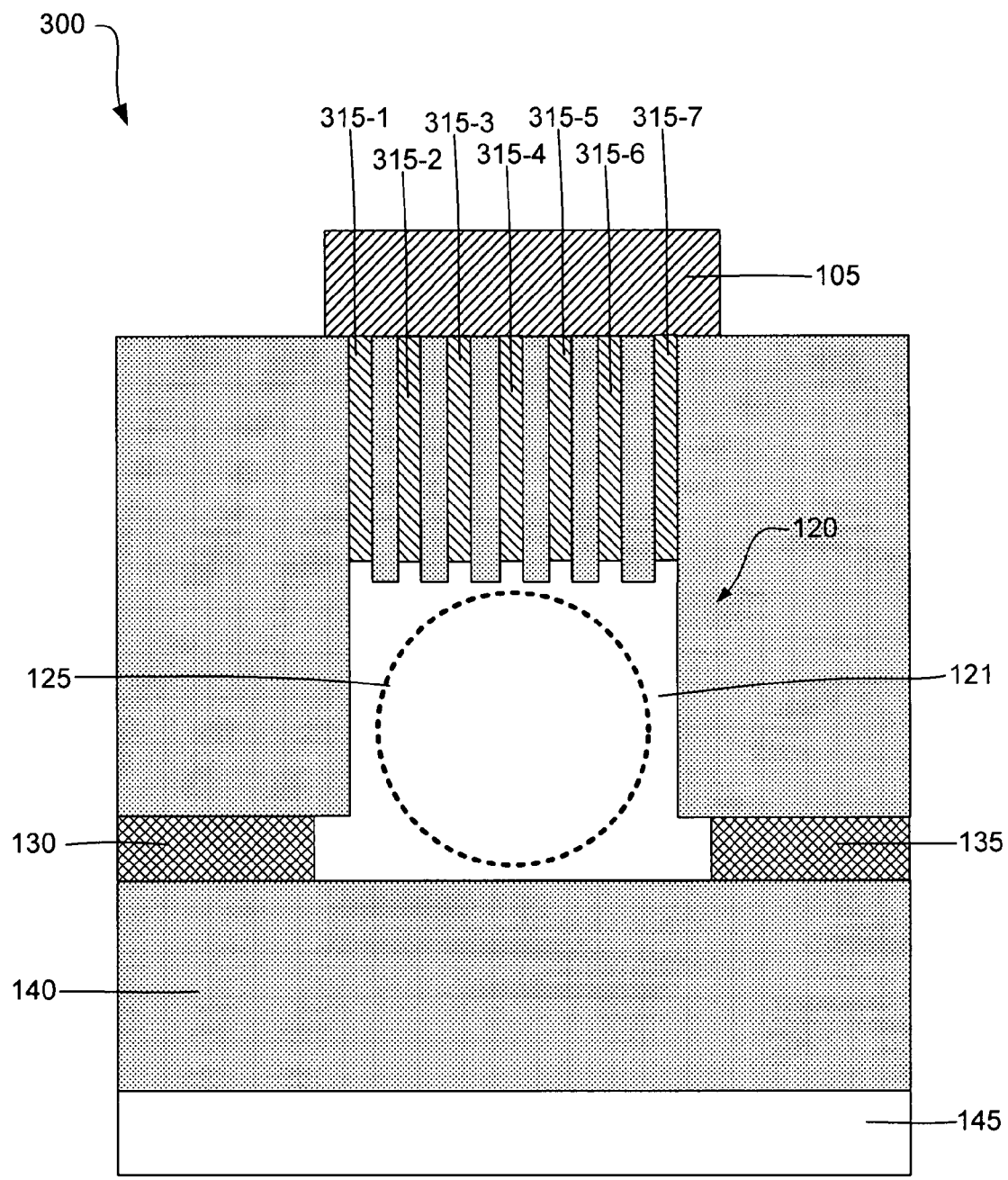
FIG. 3 is a cross-sectional diagram of an exemplary optical apparatus, according to principles described herein.

Referring now to FIG. 3, another exemplary optical apparatus (300), consistent with the principles described above, is shown. The optical apparatus (300) includes seven semiconductor electrical interconnects (315). The increased number of semiconductor electrical interconnects (315) may provide even more consistency and uniformity when electric fields are applied to the optical waveguide by means of the electrical interconnects (315). Furthermore, the additional semiconductor electrical interconnects (315) may provide increased mechanical stability to the optical apparatus (300).

Figure 4:
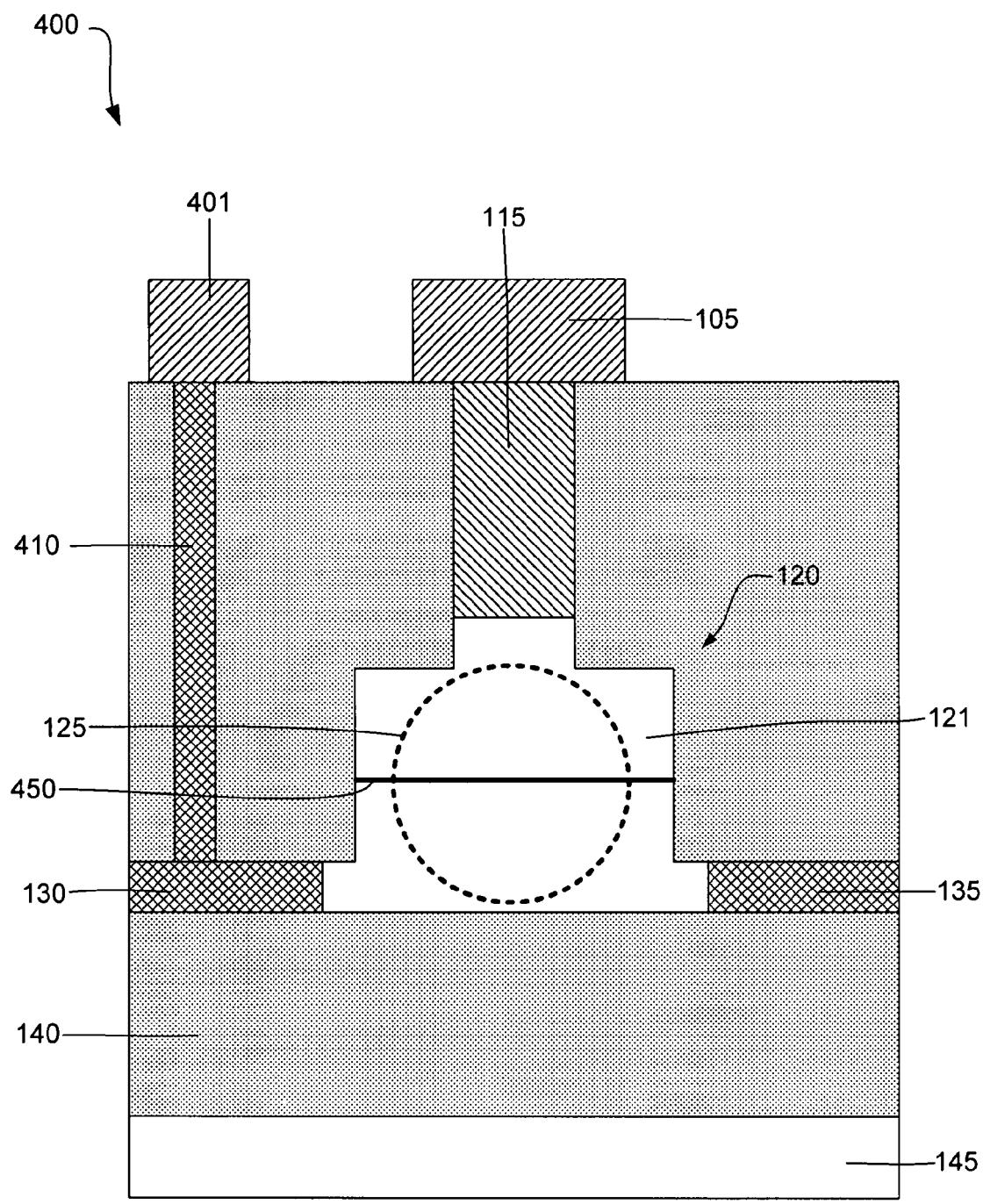
FIG. 4 is a cross-sectional diagram of an exemplary optical apparatus, according to principles described herein.

Referring now to FIG. 4, another exemplary optical apparatus (400), consistent with the principles described above, is shown. The optical waveguide (120) shown in this example includes a thin quantum well (450). In the present example, the quantum well (450) includes a thin layer of germanium. The germanium quantum well (450) is configured to absorb the optical field within the optical waveguide (120), which may provide significant advantages in embodiments where the optical apparatus (400) is used as an optical resonator. Further advantages, implications, and embodiments of the germanium quantum well (450) are described in U.S. patent application Ser. No. 11/881,679, filed Jul. 27, 2007, the specification of which is incorporated herein by reference in its entirety.

The optical apparatus (400) of the present example further includes an additional electrical contact surface (401) in communication with one of the doped side portions (130) of the optical waveguide (120). The doped side region is in electrical communication with a semiconductor electrical interconnect (410) extending vertically from the doped portion (130). The semiconductor electrical interconnect may include substantially the same type and density of doping as the side portion (130) to enable the conduction of electrical current between the side portion (130) and the second electrical contact surface (401).

Figure 5:
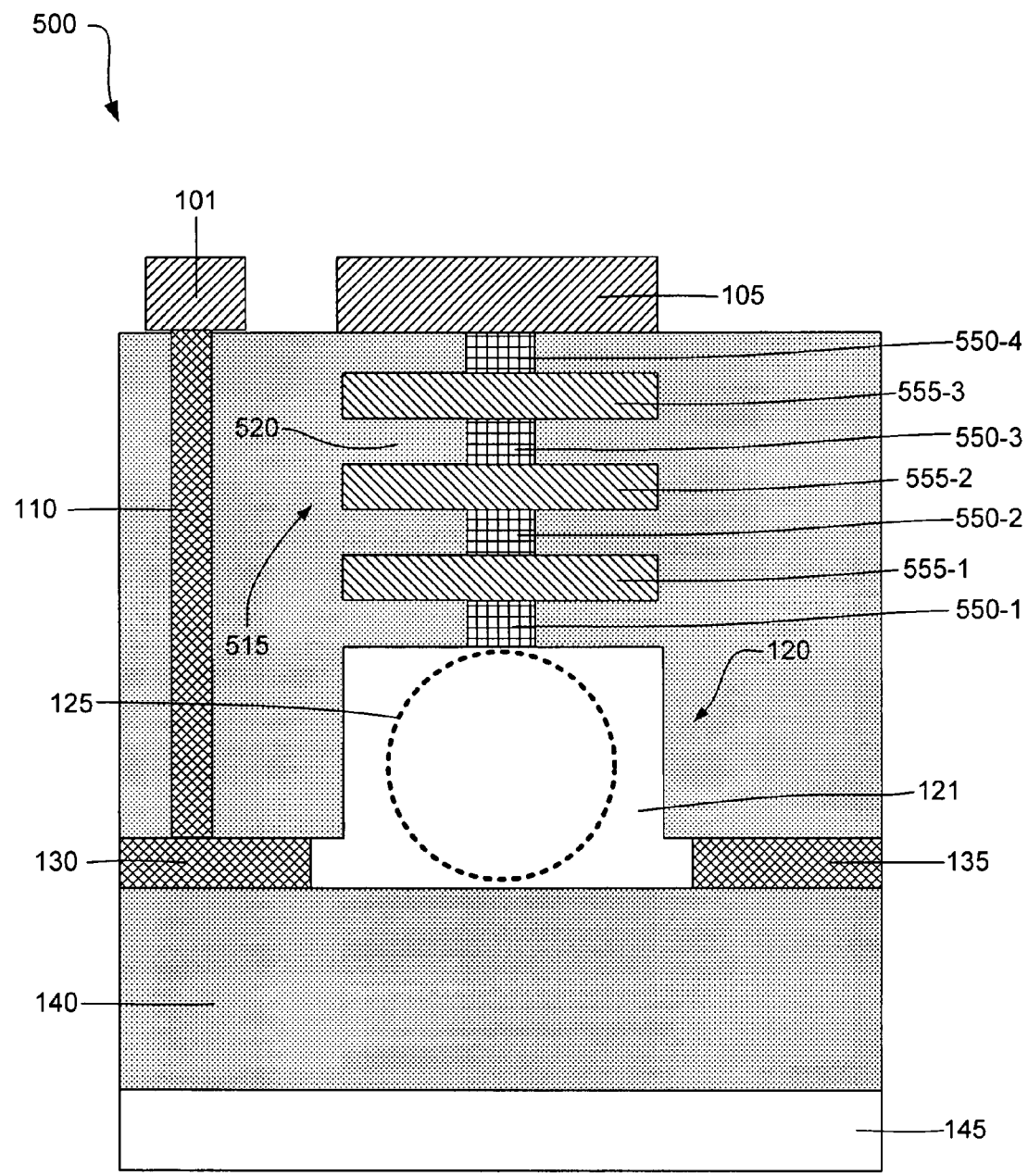
FIG. 5 is a cross-sectional diagram of an exemplary optical apparatus, according to principles described herein.

Referring now to FIG. 5, another exemplary optical apparatus (500) consistent with the principles of the present specification is shown. The exemplary optical apparatus (500) includes an optical waveguide (120), a semiconductor substrate (145), oxide material (140), and electrical contact surfaces (101, 105) similar to those described with respect to previously illustrated embodiments.

The exemplary optical apparatus (500) includes a semiconductor electrical interconnect (515) extending vertically from the optical waveguide (120) to one of the electrical contact surfaces (105). The electrical interconnect (515) includes a stack of alternating layers of a first material (550, e.g., 550-1 to 550-4) and a second material (555, e.g., 555-1 to 555-3). The first and second materials may be the same base element or compound having different levels of doping, or different elements or compounds completely. In one example, the semiconductor electrical interconnect (515) includes alternating layers of silicon and germanium. Recesses (520) are formed in the electrical interconnect (515) to aid in optical isolation. These recesses (520) may be formed by selective etching and/or by other fabrication processes known in the art. The recesses (520) shown here are filled with silicon dioxide. In other embodiments, the recesses (520) may be filled with some other dielectric material having a low index of refraction, air, or combinations thereof. The recesses may also contain a full or partial vacuum. Moreover, the material filling the recesses (520) and the oxide material (140) need not be the same material. A variety of different materials may be used to fill the recesses (520) and as insulating oxide material (140).

Figure 6A:
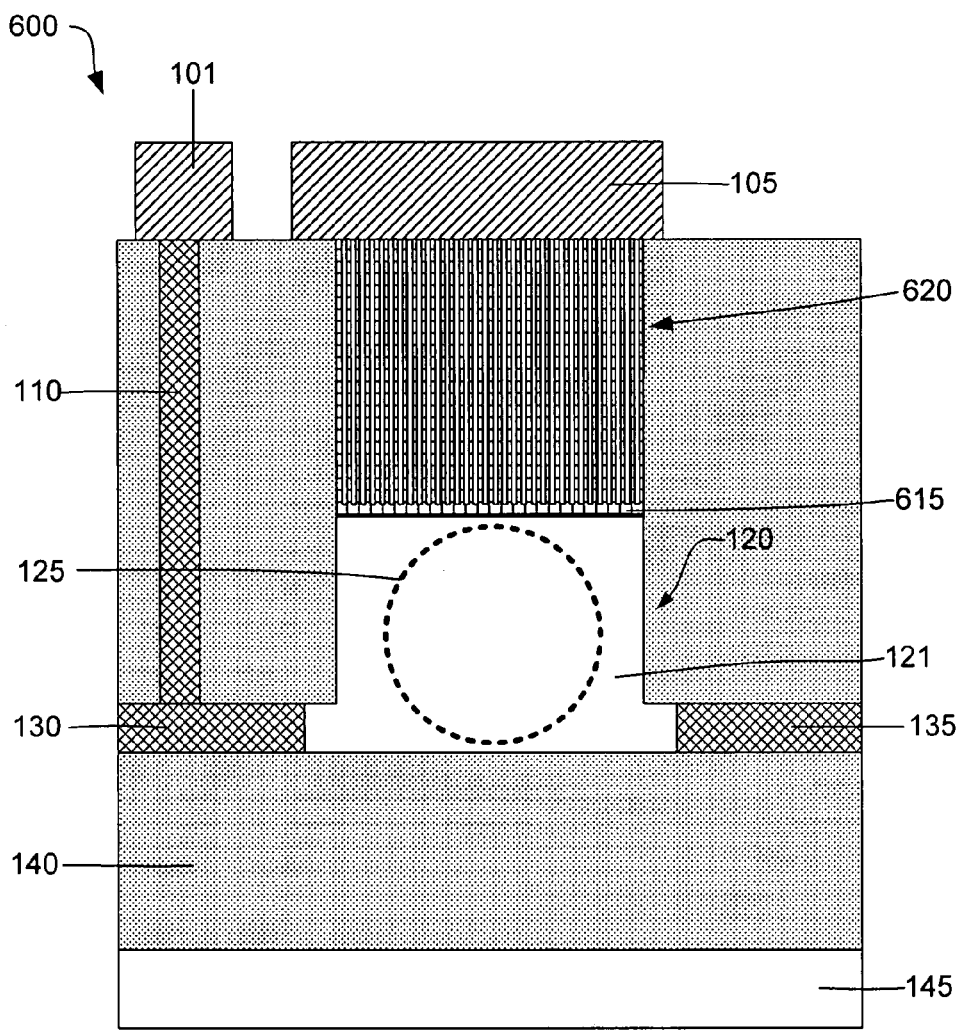
FIG. 6A is a cross-sectional diagram of an exemplary optical apparatus, according to principles described herein.

Referring now to FIG. 6A, another exemplary optical apparatus (600) is shown. The optical apparatus (600) includes a semiconductor electrical interconnect (615) that connects the optical waveguide (120) to one of the electrical contact surfaces (105), as discussed previously. The semiconductor electrical interconnect (615) of the present example includes a plurality of nanoholes (620) having dimensions that are substantially smaller than the wavelength of optical energy that propagates through the optical waveguide (120). As shown, the nanoholes (620) are oriented substantially vertically with respect to the substrate (145) and extend from the optical waveguide (120) toward the electrical contact surface (105) in a direction substantially away from the substrate (145). In different embodiments, the density and size of the nanoholes (620) may vary substantially, according to other optical characteristics of the optical apparatus (600). In some embodiments, the electrical interconnect (615) may be formed using a very directional, selective etch. A block copolymer material may be used as an etch mask, according to principles understood in the art. In other embodiments, the electrical interconnect may be formed by growing small, relatively dense nanowires of silicon or another semiconductor. Furthermore, the nanoholes (620) of the present embodiment may be located throughout the electrical interconnect (615) in a two-dimensional lattice. While in some cases, it may be desirable that the nanoholes (620) and/or nanowires exhibit a degree of regularity in positioning. However, in other embodiments the nanoholes (620) and/or nanowires need not be placed in any type of lattice or other regular pattern.

Figure 6B:
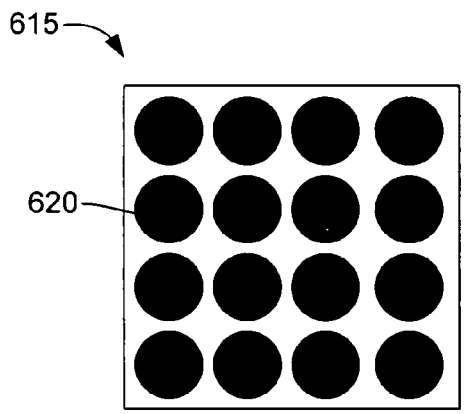
FIGS. 6B and 6C are top view diagrams of portions of exemplary embodiments of semiconductor electrical interconnect structures, according to principles described herein.
Figure 6C:
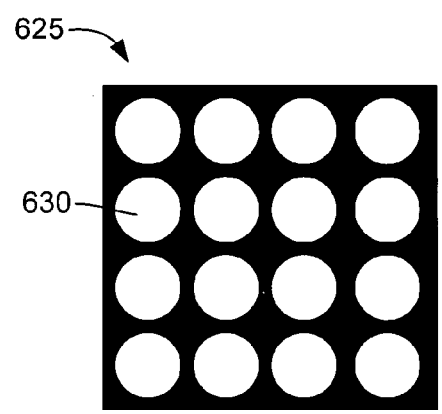

Referring now to FIGS. 6B and 6C, magnified top views are shown of portions of alternate embodiments of electrical interconnect (615, 625) structures. FIG. 6B shows the nanoholes (620) of the electrical interconnect (615) shown in FIG. 6A. FIG. 6C shows an electrical interconnect (625) structure having nanowires (630) of semiconductor material extending away from the optical waveguide (120) and in electrical communication with the electrical contact surface (105).

Figure 7:
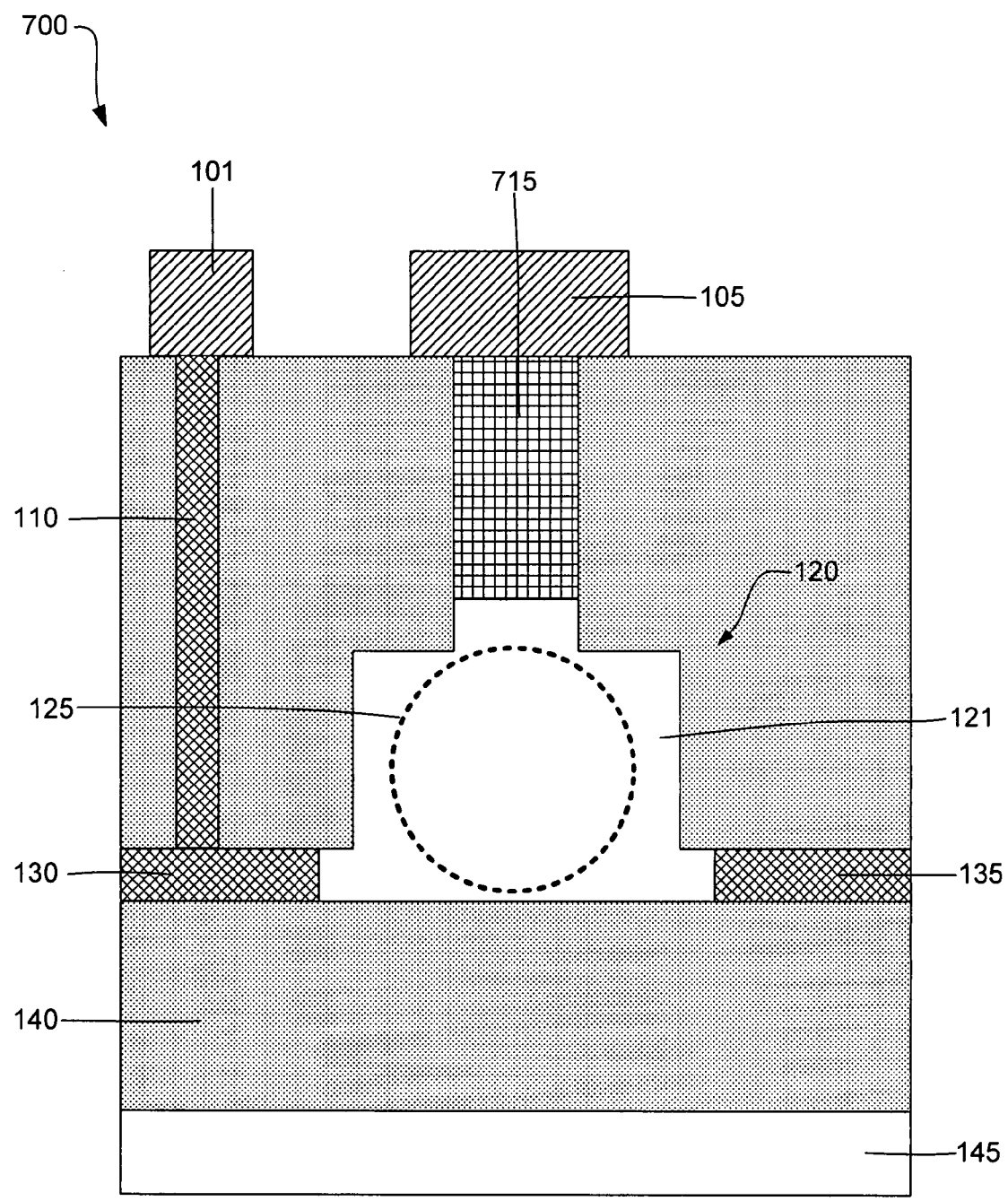
FIG. 7 is a cross-sectional diagram of an exemplary optical apparatus, according to principles described herein.

Referring now to FIG. 7, another exemplary optical apparatus (700) is shown, consistent with the principles described previously. The optical apparatus (700) has an electrical interconnect (715) similar in geometry to the electrical interconnect (115, FIG. 1) of FIG. 1. In contrast to the electrical interconnect (115, FIG. 1) of FIG. 1, which is an extension of the semiconductor material in the optical waveguide (120), the present electrical interconnect (715) is formed by growing a semiconductor as the interconnect (715) that is distinct from the semiconductor used in the optical waveguide (120).

Exemplary Method

Figure 8:
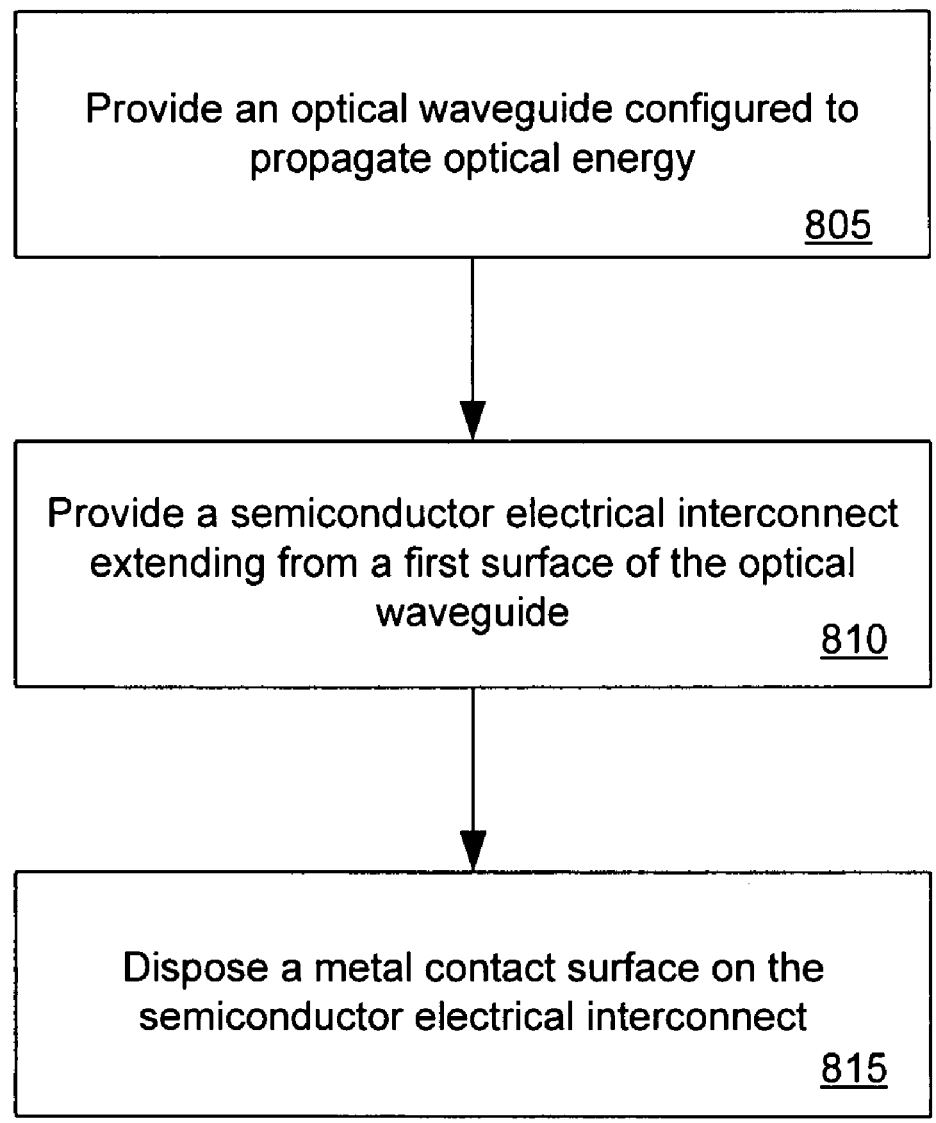
FIG. 8 is a flowchart illustrating an exemplary method of fabricating an optical apparatus, according to principles described herein.

Referring now to FIG. 8, a flowchart illustrating an exemplary method (800) of fabricating an optical apparatus is shown. The method includes providing (step 805) an optical waveguide configured to propagate optical energy and providing (step 810) a semiconductor electrical interconnect extending from a first surface of the optical waveguide. The semiconductor electrical interconnect has a geometry configured to substantially confine the optical energy to the optical waveguide. In some embodiments, the method (800) may further include selectively etching at least one recess in the semiconductor electrical interconnect. Recesses in the semiconductor electrical interconnect may be filled with an insulating material. Specifically, the insulating material may have a low index of optical refraction in comparison to the index of optical refraction of the electrical interconnect.

The method (800) further includes disposing (step 815) a metal contact surface on the semiconductor electrical interconnect. The metal contact surface may be disposed on the semiconductor electrical interconnect at a distance from the waveguide that is typically at least one wavelength, in the material, of the optical energy configured to propagate throughout the waveguide.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. An optical apparatus, comprising:
a substrate;
a waveguide configured to propagate optical energy disposed on said substrate; and
a semiconductor electrical interconnect disposed between said waveguide and an electrical contact surface, said interconnect being in electrical communication with said electrical contact surface;
in which said semiconductor electrical interconnect comprises a geometry configured to substantially confine said optical energy to said waveguide, and
in which said semiconductor electrical interconnect is configured to separate said waveguide and said electrical contact surface by a distance greater than one wavelength of the optical energy to propagate through said waveguide.

2. The optical apparatus of claim 1, wherein said semiconductor electrical interconnect comprises at least one physical feature selected from the group consisting of: recesses, protrusions, trenches, holes, nanoholes, nanowires, and ridges.

3. The optical apparatus of claim 2, wherein said semiconductor electrical interconnect comprises at least one recess; wherein said at least one recess is filled with an insulating material having a lower refractive index than said waveguide.

4. The optical apparatus of claim 3, wherein said semiconductor electrical interconnect comprises a plurality of recesses, wherein different recesses are filled with different insulating materials.

5. The optical apparatus of claim 1, wherein said semiconductor electrical interconnect is doped with electronic carriers selected from the group consisting of: electrons and holes.

6. The optical apparatus of claim 1, further comprising at least one layer of material intermediate said substrate and said optical waveguide.

7. The optical apparatus of claim 1, further comprising a second electrical contact surface in electrical communication with at least one doped side region in said optical waveguide.

8. An optical resonator, comprising:
a substrate;
an insulating layer disposed on said substrate;
a semiconductor waveguide disposed on said insulating layer; and
a plurality of semiconductor electrical interconnects extending at least one half of a wavelength of optical energy configured to propagate through said waveguide from a first surface of said semiconductor waveguide in a direction substantially away from said substrate, each of said plurality of semiconductor electrical interconnects forming a substantially independent electrical path from an electrical contact surface to said semiconductor waveguide;
wherein said plurality of semiconductor electrical interconnects comprise a geometry configured to substantially confine said optical energy to said waveguide.

9. The optical resonator of claim 8, wherein said plurality of semiconductor electrical interconnects comprise at least one physical feature selected from the group consisting of: recesses, protrusions, trenches, holes, nanoholes, nanowires, and ridges.

10. The optical resonator of claim 9, wherein said plurality of semiconductor electrical interconnects are separated by at least one recess; wherein said recess is filled with an insulating material having a lower refractive index than said waveguide and plurality of semiconductor electrical interconnects.

11. The optical resonator of claim 10, wherein said insulating material in said at least one recess is different from material in said insulating layer.

12. The optical resonator of claim 9, said plurality of semiconductor electrical interconnects are separated by at least one recess; wherein said at least one recess comprises a partial or full vacuum.

13. The optical resonator of claim 8, wherein said semiconductor electrical interconnects are doped with electronic carriers selected from the group consisting of: electrons and holes.

14. The optical resonator of claim 8, wherein said waveguide comprises a semiconductor body having a substantially intrinsic center region and doped side regions.

15. The optical resonator of claim 14, further comprising a second electrical contact surface in electrical communication with at least one of said doped side regions.

16. The optical resonator of claim 8, wherein each of said plurality of semiconductor electrical interconnects is in electrical communication with an electrical contact surface and contacting said first surface at different locations such that charge carrier injection into said semiconductor waveguide is distributed over said first surface.

17. A method of fabricating an optical apparatus, comprising:

providing an optical waveguide configured to propagate optical energy;

providing a plurality of semiconductor electrical interconnects extending from a first surface of said optical waveguide, wherein said plurality of semiconductor electrical interconnects comprise a geometry configured to substantially confine optical energy to said optical waveguide; and disposing a metal contact surface on said plurality of semiconductor electrical interconnects.

18. The method of claim 17, further comprising selectively etching at least one recess in said plurality of semiconductor electrical interconnects.

19. The method of claim 18, further comprising filling said at least one recess with an electrically insulating material having a lower refractive index than said optical waveguide and said plurality of semiconductor electrical interconnects.

20. The method of claim 17, wherein said metal contact surface is disposed on said semiconductor electrical interconnects at a distance from said optical waveguide of at least one half of the wavelength, measured in the material of said optical waveguide, of the optical energy configured to propagate through said optical waveguide.

* * * * *

UNITED STATES PATENT AND TRADEMARK OFFICE
CERTIFICATE OF CORRECTION

PATENT NO. : 7,609,916 B2  Page 1 of 1
APPLICATION NO. : 11/900714
DATED : October 27, 2009
INVENTOR(S) : Charles M. Santori et al.

It is certified that error appears in the above-identified patent and that said Letters Patent is hereby corrected as shown below:

In column 8, line 54, in Claim 12, delete "said" and insert -- wherein said --, therefor.

Signed and Sealed this

Twenty-seventh Day of April, 2010

David J. Kappos
*Director of the United States Patent and Trademark Office*